US009108260B2

(12) United States Patent
Nagae et al.

(10) Patent No.: US 9,108,260 B2
(45) Date of Patent: Aug. 18, 2015

(54) MANUFACTURING METHOD OF ELECTRODE FOR HONEYCOMB STRUCTURE FORMING DIE

(75) Inventors: Tomoki Nagae, Nagoya (JP); Masanari Iwade, Nagoya (JP); Hirofumi Hosokawa, Nagoya (JP); Seiichiro Hayashi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 870 days.

(21) Appl. No.: 13/316,859

(22) Filed: Dec. 12, 2011

(65) Prior Publication Data

US 2012/0174397 A1   Jul. 12, 2012

(30) Foreign Application Priority Data

Dec. 15, 2010   (JP) ................... 2010-279792

(51) Int. Cl.
*H01R 9/00* (2006.01)
*H05K 3/00* (2006.01)
*B23H 9/00* (2006.01)

(52) U.S. Cl.
CPC .............. *B23H 9/00* (2013.01); *B23H 2200/30* (2013.01); *Y10T 29/49204* (2015.01)

(58) Field of Classification Search
CPC ................... Y10T 29/49204; Y10T 29/49222; B23H 1/04; B23H 9/00; B23H 2200/30
See application file for complete search history.

(56) References Cited

U.S. PATENT DOCUMENTS

| | | | |
|---|---|---|---|
| 2002/0153356 A1* | 10/2002 | Fujita et al. | 219/69.17 |
| 2005/0198822 A1 | 9/2005 | Hironaga et al. | |
| 2008/0135141 A1 | 6/2008 | Fujita | |
| 2008/0196237 A1* | 8/2008 | Shinya et al. | 29/557 |

FOREIGN PATENT DOCUMENTS

| | | |
|---|---|---|
| JP | 04-074131 B2 | 11/1992 |
| JP | 05-261621 A1 | 10/1993 |
| JP | 07-040149 A1 | 2/1995 |
| JP | 2001-071216 A1 | 3/2001 |
| JP | 2005-254345 A1 | 9/2005 |
| JP | 2008-142812 A1 | 6/2008 |
| JP | 2010-234515 A1 | 10/2010 |

OTHER PUBLICATIONS

Japanese Office Action dated Jan. 15, 2013.
Extended European Search Report dated Mar. 30, 2012.

* cited by examiner

*Primary Examiner* — Peter DungBa Vo
*Assistant Examiner* — Jeffrey T Carley
(74) *Attorney, Agent, or Firm* — Burr & Brown, PLLC (57) ABSTRACT

By providing a manufacturing method of an electrode for a honeycomb structure forming die including: preparing a thick plate-like electrode base body made of an electricity discharging material and having two surfaces; making a plurality of holes in the electrode base body at positions corresponding to flow-through cells; inserting processing electrodes into the holes, and discharging electricity from the insides of the holes toward side surfaces of the holes of the electrode base body to process the side surfaces of the holes of the electrode base body into shapes corresponding to the porous partition walls; whereby obtaining an electrode where a plurality of electrode cells partitioned by electrode partition walls appear on at least one of the surfaces thereof.

6 Claims, 8 Drawing Sheets

MANUFACTURING METHOD OF ELECTRODE FOR HONEYCOMB STRUCTURE FORMING DIE

TECHNICAL FIELD

The present invention relates to a manufacturing method of an electrode. The electrode is for use in processing a die. The die is used for forming a honeycomb structure.

BACKGROUND ART

A honeycomb structure is usually a ceramic product whose outer shape is a columnar shape or a prism shape. This honeycomb structure includes a plurality of cells partitioned by partition walls being made of a ceramic porous material and having a large number of pores, which has a honeycomb shape. Such a honeycomb structure, including the cells which become through channels of a gas, is often used as a filter or a catalyst carrier.

The honeycomb structure can be manufactured through extrusion forming by use of an extrusion forming machine including a honeycomb structure forming die for exclusive use (also simply referred to as die). This die is obtained by forming, in a die base body made of a pure metal, an alloy or the like, back holes (also often referred to as the introduction holes) through which a forming raw material (often referred to as the kneaded clay) is introduced, and slits which communicate with the back holes. Each of the slits has a shape matching a sectional shape of each cell, and has a width corresponding to a thickness of each partition wall of the honeycomb structure. Each of the back holes has a width larger than each slit, and is provided at a position corresponding to an intersection of the slits. According to the extrusion forming by use of such a die, the forming raw material introduced through the back holes moves toward the slits each having a small width, is extruded through slit openings, and is discharged as a honeycomb-structure formed body (often referred to as the honeycomb formed body).

Moreover, the above die is obtained by forming the above slits and back holes in the die base body which is not provided with any slit or back hole, through electric discharge machining (EDM) using an electrode, cutting, grinding, electrolytic machining or the like. For example, Patent Documents 1 and 2 disclose die manufacturing steps for obtaining a honeycomb structure including cells each having a hexagonal sectional shape. In the processes, a combtooth-like electrode (often referred to as the rib electrode) including a large number of thin flat plate-like projections adjusted to the slits (often referred to as the ribs) is used. Moreover, the slits are processed by the electricity discharged from the thin flat plate-like projections in the electrode.

PRIOR ART DOCUMENT

Patent Document

[Patent Document 1] Japanese Patent No. 1784822
[Patent Document 2] JP-A-2005-254345

SUMMARY OF THE INVENTION

Problems to Be Solved by the Invention

In recent years, it has been requested to increase the cell density and reduce the thickness of partition walls in the honeycomb structure. For example, in the honeycomb structure including cells each having a hexagonal sectional shape, it is required that the number of the cells is from 400 to 900 per square inch, the distance between two opposing sides of the hexagonal shape of each cell, i.e., the opposing side length is from 0.50 to 2.00 mm, and the thickness of each of the partition walls which define the cells is from 1.5 to 6 mils. One mil is approximately 0.0254 mm. If the partition walls become thin, slits of a die have to be narrowed or thinned, so that ribs need to be thinned in an electrode for use in the electric discharge machining of the die. In this case, the breakage of the electrode easily occurs. For example, if projections of the electrode break during the electric discharge machining, this becomes a cause for an abnormal cell shape of the honeycomb structure formed by using the obtained die, which eventually leads to the deterioration of yield of a ceramic product.

The investigations of countermeasures under awareness of such problems have resulted in an idea that when the electrode is not a rib electrode but has an electrode shape which is complementary to all or part of a die shape, the electrode does not easily break during the electric discharge machining, as compared with the rib electrode. However, for obtaining the honeycomb structure including thin partition walls, the slits of the die unchangeably have to be narrowed or thinned. When the electrode shape is formed to be complementary to the die shape, electrode portions corresponding to the slits become thin. Therefore, if the electrode does not break during the electric discharge machining, the electrode is deformed sometimes. Therefore, further improvements are required so that the electrode does not break or is not deformed. Moreover, when the electrode having the shape which is complementary to the whole die shape and including thin portions corresponding to the slits is prepared by, for example, wire electric discharge machining, much time is required. Therefore, means for preparing the electrode in a short time is also required.

The present invention has been developed in view of such situations. An object of the present invention is to provide means which can obtain, by electric discharge machining, a die including thin or narrow slits for obtaining a honeycomb structure including thin partition walls and which can obtain, in a short time, an electrode that does not break or is not deformed during the electric discharge machining. As a result of repeated researches, it has been found that this object can be achieved by the following means to complete the present invention.

Means to Solve the Problems

That is, according to the present invention, there is provided a manufacturing method of an electrode for a honeycomb structure forming die which forms a honeycomb structure including a plurality of flow-through cells partitioned by porous partition walls, the method comprising: preparing a thick plate-like electrode base body made of an electricity discharging material and having two surfaces; making a plurality of holes at positions corresponding to the flow-through cells, in the electrode base body; inserting processing electrodes into the plurality of holes, respectively, and discharging electricity from the insides of the holes toward side surfaces of the holes of the electrode base body to process the side surfaces of the holes of the electrode base body into shapes corresponding to the porous partition walls; whereby obtaining an electrode where a plurality of electrode cells partitioned by electrode partition walls appear on at least one of the surfaces thereof.

The manufacturing method of the electrode for the honeycomb structure forming die according to the present invention is a method of manufacturing the electrode (often referred to as the honeycomb electrode) for use in the processing of the honeycomb structure forming die. The manufactured honeycomb electrode is for use in the processing of the die, and is used to manufacture the die. Moreover, the die is used to form the honeycomb structure. More strictly, the die is the forming die for use in passing a forming raw material, which is the kneaded clay made of a ceramic material as a main material before firing, to obtain a formed body having a honeycomb shape, that is, the honeycomb formed body. In other words, the die is a die used for forming. However, since the expression "electrode for a die for forming a honeycomb structure" is verbose, in the description of the present specification, the electrode which is a manufacturing object of the present invention will be referred to as electrode for honeycomb structure forming die. Moreover, the terms "partition walls" and "cells" are also used to mean the electrode partition walls and the electrode cells, respectively, for the honeycomb electrode. Therefore, in the description of the present specification, the terms "porous partition walls" and "flow-through cells" are used in case of the honeycomb structure.

A shape corresponding to a sectional shape of the honeycomb structure appears in a die shape, and a shape corresponding to the die shape appears in a shape of the electrode for forming die. Specifically, the shape of each of slits (recess portions) of the die is a complementary shape to the shape of each of the porous partition walls (projecting portions) of the honeycomb structure. Moreover, the shape of each of the electrode partition walls (projecting portions) of the electrode for forming die is a complementary shape to the shape of each of the slits (recess portions) of the die. The complementary shape is a mutually compensating shape. The complementary shape is, for example, a shape integrated by fitting or engaging as in the recess portions and the projecting portions. However, the complementary shape in the present description is not necessarily limited to an engaged shape which does not have any gap. The electric discharge machining usually requires a machining margin, and hence a gap corresponding to the machining margin or a shift is allowed.

Moreover, each of the electrode cells of the electrode for the honeycomb structure forming die has a shape which is analogous, or which resembles to each of the flow-through cells of the honeycomb structure. Each of the electrode partition walls of the electrode for the honeycomb structure forming die has a thickness which is different from that of each porous partition wall of the honeycomb structure. Therefore, as a whole, the shape of the electrode for the honeycomb structure forming die is not strictly analogous to the shape of the honeycomb structure, but is schematically similar thereto. Therefore, the electrode for the honeycomb structure forming die is referred to as the honeycomb electrode. Each of the hole side surfaces of the electrode base body is processed into the shape corresponding to each of the porous partition walls, and eventually, in the electrode base body, the electrode partition walls each having the shape corresponding to each porous partition wall are formed. Moreover, in accordance with the honeycomb structure including the plurality of flow-through cells partitioned by the porous partition walls, a plurality of electrode cells partitioned by the electrode partition walls appear in this honeycomb electrode. At least one of the surfaces is any surface of the thick plate-like honeycomb electrode having two surfaces, wherein the honeycomb electrode is obtained by processing the thick plate-like electrode base body having two surfaces. Since the electrode has a thick plate-like shape, the surface thereof can be present also in a thickness direction, but the two surfaces indicate the two main surfaces, i.e., the front surface and the back surface which are not disposed in the thickness direction. When the plurality of electrode cells partitioned by the electrode partition walls appear, it is meant that all or part of the shape corresponding to the sectional shape or the end surface shape of the honeycomb structure appears on at least one of the surfaces of the thick plate-like honeycomb electrode. Moreover, the sectional shape of the honeycomb structure is a shape of a section which is vertical to an axial direction of the honeycomb structure whose outer shape is usually a columnar shape or a prism shape.

In the die or the honeycomb electrode, all or part of the shape corresponding to the sectional shape of the honeycomb structure, i.e., the complementary shape or the schematically similar shape may appear. When the electric discharge machining is performed by using a honeycomb electrode in which all of the shape corresponding to the sectional shape of the honeycomb structure appears on at least one surface, it is possible to complete the die at a time. The honeycomb electrode may be called as a full-size honeycomb electrode including a fringe portion (described in detail later). Moreover, when the electric discharge machining is performed by using a honeycomb electrode in which part of the shape corresponding to the sectional shape of the honeycomb structure appears on at least one surface, which may be called as a partial-size honeycomb electrode which does not include any fringe portion (described in detail later), it is possible to complete the die by repeatedly using the partial-size honeycomb electrode.

In the manufacturing method of the electrode for the honeycomb structure forming die according to the present invention, the honeycomb electrode discharges the electricity during the processing of the die. Moreover, this honeycomb electrode itself can be obtained by processing the side surfaces of the holes of the electrode base body into the shapes corresponding to the porous partition walls by use of the processing electrodes which discharge the electricity. There is no doubt that both the processing electrode and the honeycomb electrode are electric discharge electrodes. As to the holes made in the electrode base body, the shape of the section of each hole which is vertical to the thickness direction, i.e., the hole sectional shape may be a polygonal shape such as a quadrangular shape, but is preferably a round shape. In this case, the made holes become round holes. There is not any special restriction on means for making the holes in the electrode base body, and, for example, machining such as drilling or the like, electric discharge machining or the like can be used.

In the manufacturing method of the electrode for the honeycomb structure forming die according to the present invention, it is preferable that the plurality of processing electrodes are used for the plurality of holes, and the plurality of processing electrodes are integrated through a support portion. When each of the processing electrodes has a prism shape, the electrode has a combtooth-like shape as a whole.

In the manufacturing method of the electrode for the honeycomb structure forming die according to the present invention, the shape of the processing electrode is preferably a prism shape. Examples of the prism shape include a quadrangular rod shape and a hexagonal rod shape.

The manufacturing method of the electrode for the honeycomb structure forming die according to the present invention is preferably used in a case where a shape of each of the electrode cells is a hexagonal shape. In this case, the shape corresponding to the sectional shape of the honeycomb structure is a shape in which a plurality of hexagonal electrode cells are continuously formed. In the present description, the shape of each electrode cell indicates an electrode cell shape which appears on one of the surfaces of the thick plate-like honeycomb electrode. The electrode cell can be regarded as a space having a rod shape. When the shape of the electrode cell is, for example, the hexagonal shape, the electrode cell forms a space having a hexagonal rod shape.

The manufacturing method of the electrode for the honeycomb structure forming die according to the present invention is preferably used in a case where the shapes of the electrode cells are an octagonal shape and a quadrangular shape. In this case, the shape corresponding to the sectional shape of the honeycomb structure is a shape in which a plurality of octagonal electrode cells and a plurality of quadrangular electrode cells are alternately and continuously formed.

Effects of the Invention

According to a manufacturing method of an electrode for a honeycomb structure forming die according to the present invention, processing electrodes are inserted into holes made in an electrode base body, electricity is discharged from the insides of the holes toward side surfaces of the holes of the electrode base body, and the side surfaces of the holes of the electrode base body are processed into shapes corresponding to porous partition walls of a honeycomb structure, to obtain a honeycomb electrode in which a plurality of electrode cells partitioned by electrode partition walls appear. Therefore, as compared with a case where individually independent rib electrodes are used while maintaining a desirable shape, the electrode partition walls can further be thinned or made finer. Therefore, the electrode manufactured by the manufacturing method of the electrode for the honeycomb structure forming die according to the present invention is preferable as an electrode for use in obtaining a die including thinner or narrower slits to obtain the thinner porous partition walls. According to the manufacturing method of the electrode for the honeycomb structure forming die according to the present invention, 0.01 mm is realized as a thickness of each electrode partition wall of the obtained honeycomb electrode, whereas in a conventional rib electrode, a limit of the thickness or the thinness is 0.03 mm.

Since the honeycomb electrode is used to process the die, a plurality of electrode cells partitioned by the electrode partition walls may appear on at least one surface of the honeycomb electrode. In other words, the electrode cells do not have to have the same shape through a space between two surfaces of the honeycomb electrode or the electrode base body. In a surface on which any electrode cell does not appear, holes may have a first opened shape. In this case, the plurality of electrode cells partitioned by the electrode partition walls may appear only on one surface of the honeycomb electrode. The honeycomb electrode having such a configuration has a higher strength as compared with a honeycomb electrode through which the electrode cells have the same shape. In the manufacturing method of the electrode for the honeycomb structure forming die according to the present invention, insertion degrees of the processing electrodes are adjusted, when inserting the processing electrodes into the holes made in the electrode base body, discharging the electricity from the insides of the holes toward the side surfaces of the holes of the electrode base body and processing the side surfaces of the holes of the electrode base body into the shapes corresponding to the porous partition walls of the honeycomb structure. In consequence, it is possible to easily obtain the honeycomb electrode in which a plurality of electrode cells partitioned by the electrode partition walls appear only on one surface thereof and which is excellent in strength. Furthermore, part of the first opened hole itself may extend through the electrode, and the hole does not have to have the same sectional shape, e.g., a round shape through the electrode. For example, when the first made hole is a round hole and only part of the hole, e.g., only about ⅓ of a round sectional shape is present through the electrode, the strength becomes higher. The honeycomb electrode which is excellent in strength does not easily break and is not easily deformed during electric discharge machining for obtaining the die.

In a preferable configuration of the manufacturing method of the electrode for the honeycomb structure forming die according to the present invention, a plurality of processing electrodes are used for a plurality of holes, and the plurality of processing electrodes are integrated through a support portion. Therefore, the plurality of processing electrodes can simultaneously be inserted into the plurality of holes, the electricity can simultaneously be discharged from the insides of the holes toward the side surfaces of the holes of the electrode base body, and the side surfaces of the holes of the electrode base body can be processed into the shapes corresponding to the porous partition walls. In consequence, according to the preferable configuration of the manufacturing method of the electrode for the honeycomb structure forming die of the present invention, it is possible to prepare the electrode in a short time. On conditions of the same processing, processing time or the number of process steps may be 20%, i.e., processing time or the number of process steps can be decreased by 80%, as compared with a case where processing is performed by using wire electric discharge machining (WEDM).

Detailed Description of the Invention

Hereinafter, embodiments of the present invention will appropriately be described with reference to the drawings, but it should be understood that the present invention is not limited to the following embodiments and that various changes, modifications and improvements can be added on the basis of the knowledge of a person skilled in the art, without departing from the scope of the present invention. For example, the drawings show preferable embodiments of the present invention, but the present invention is not limited by configurations or information shown in the drawings. When the present invention is performed or verified, means similar or equivalent to those described in the present description can be applied, but preferable means are described hereinbelow.

The drawings for use in the following description are schematic views, and in the respective drawings, the number of constituent elements, e.g., electrode cells or electrode partition walls does not necessarily match, and is smaller than the practical number thereof. This is because the respective drawings are drawn to facilitate the understanding of invention concepts and processing steps. For example, the number of the electrode cells concerned with a honeycomb electrode is 12 in FIG. 3A, FIG. 3B, FIG. 4, FIG. 5A, FIG. 5B and FIG. 6, seven in FIG. 7, and 16 in FIG. 8. However, needless to say, it should be understood that the practical number of the electrode cells becomes a necessary number in accordance with specifications of a honeycomb structure forming die to be obtained, e.g., a die 1 shown in FIG. 2A to FIG. 2C and further specifications of a honeycomb structure, e.g., a honeycomb structure 40 shown in FIG. 1.

The present invention is a method of manufacturing an electrode for use in processing a die to be used in forming a honeycomb structure. Therefore, a honeycomb structure, a honeycomb structure forming die and an electrode for the honeycomb structure forming die as a manufacturing object will first be described.

Figure 1:
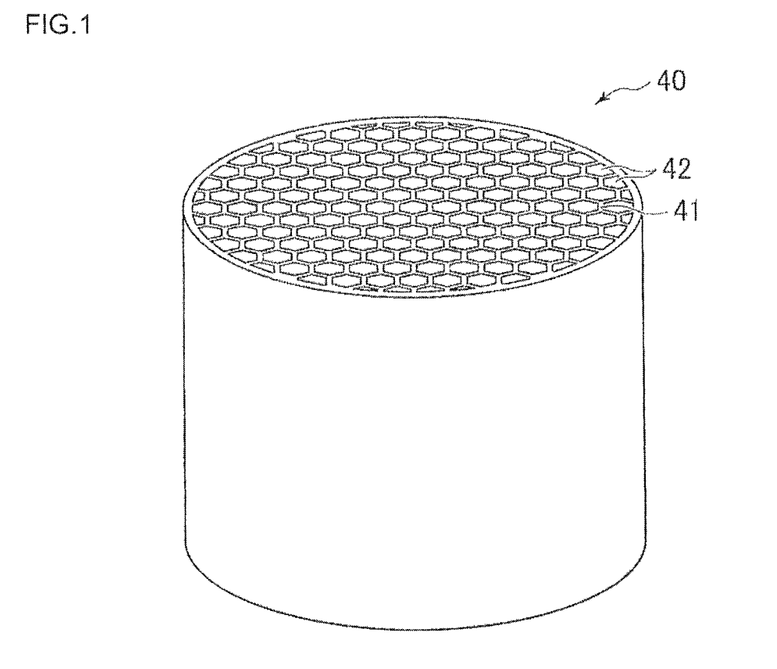
FIG. 1 is a perspective view schematically showing an example of a honeycomb structure.

[Honeycomb Structure] A honeycomb structure 40 illustrated in FIG. 1 is a ceramic product whose outer shape is a columnar shape having two end surfaces and a peripheral surface. The honeycomb structure 40 includes therein a plurality of flow-through cells 42 which are partitioned by ceramic porous partition walls 41 each including a large number of pores and which become through channels of a gas. In the honeycomb structure 40, a sectional shape of each of the flow-through cells 42 vertical to an axial direction, i.e., a shape which appears on the end surface as shown in FIG. 1 is a hexagonal shape. A main forming raw material or aggregate particles of the honeycomb structure 40 is, for example, a cordierite forming raw material such as alumina, kaolin or talc, or silicon carbide.

Figure 2A:
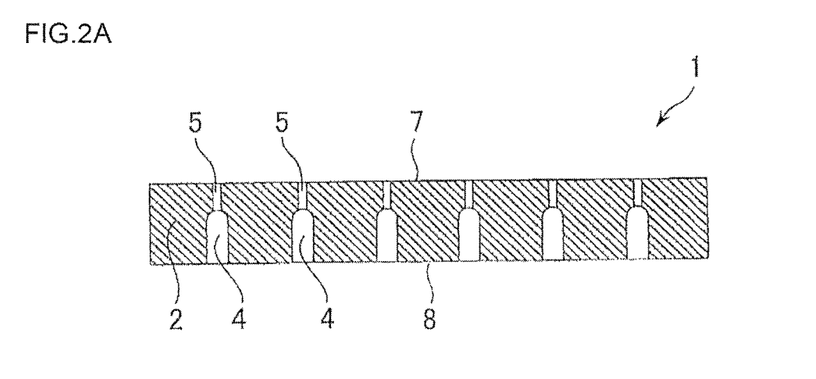
FIG. 2A is a sectional view schematically showing an example of a honeycomb structure forming die.
Figure 2B:
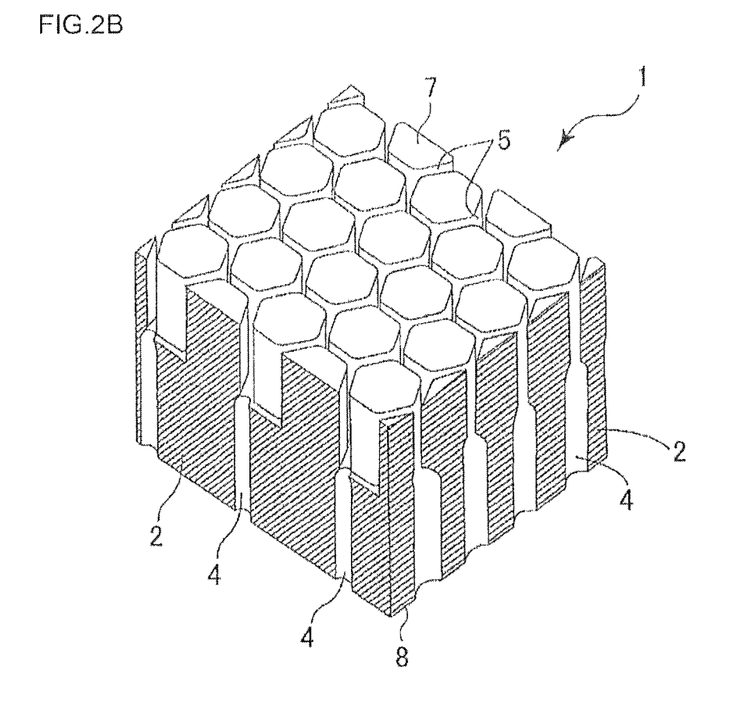
FIG. 2B is a partially enlarged perspective view schematically showing the example of the honeycomb structure forming die.
Figure 2C:
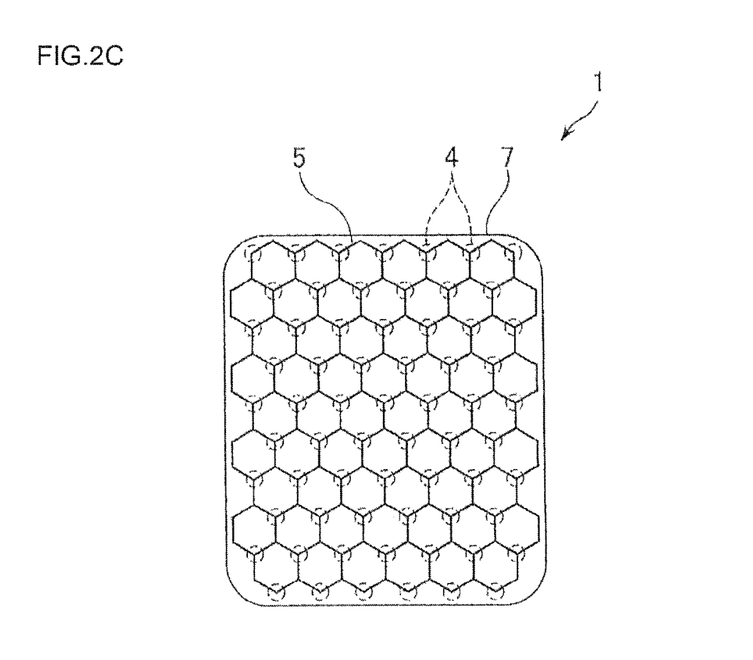
FIG. 2C is a plan view schematically showing the example of the honeycomb structure forming die.

[Honeycomb Structure Forming Die] An example of the honeycomb structure is the honeycomb structure 40 described above, and is obtained thorough extrusion forming by use of an extrusion forming machine including a honeycomb structure forming die. A die 1 or the honeycomb structure forming die illustrated in FIG. 2A to FIG. 2C is constituted of a die base body 2 having one surface 7 and the other surface 8. In the other surface 8, introduction holes 4 through which a forming raw material is introduced are formed, and in the one surface 7, slits 5 which communicate with the introduction holes 4 are formed. The slits 5 have a hexagonal shape adjusted to, for example, a shape of each of the flow-through cells 42 of the honeycomb structure 40, and have a width corresponding to, for example, a thickness of each of the porous partition walls 41 of the honeycomb structure 40. The introduction holes 4 have a width larger than the slits 5, and are provided at positions where the slits 5 intersect. A material constituting the die 1 or the die base body 2 is a metal or an alloy, and examples of the material include metals such as iron (Fe), titanium (Ti), nickel (Ni), copper (Cu) and aluminum (Al), an alloy containing these metals, for example, a stainless steel alloy such as SUS630, and tungsten carbide based cemented carbide.

Figure 3A:
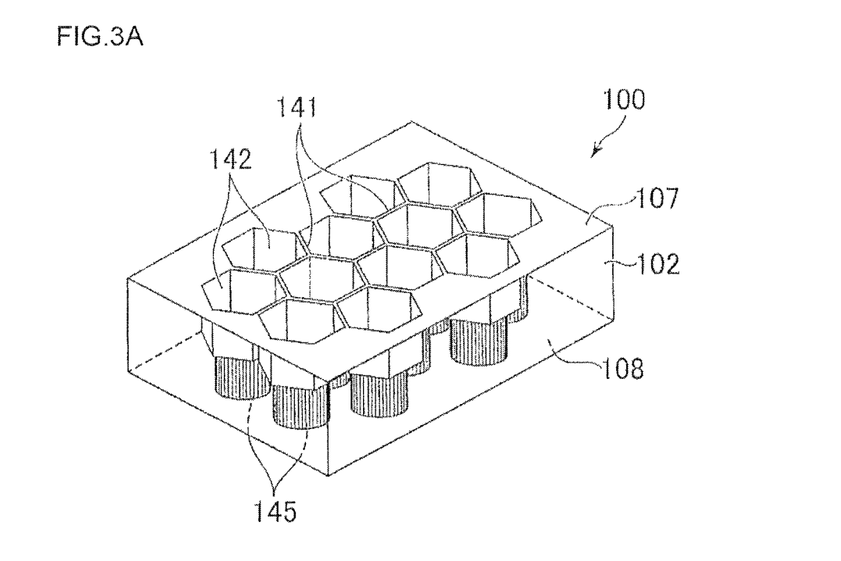
FIG. 3A is a perspective view showing an embodiment of an electrode for a honeycomb structure forming die manufactured by a manufacturing method of the electrode for the honeycomb structure forming die according to the present invention, as seen through the inside of the electrode from one surface side.

[Electrode for Honeycomb Structure Forming Die] Moreover, an example of the die is the die 1 described above, and is obtained by forming introduction holes and slits in a die base body in which any introduction hole or slit is not formed. At this time, an electrode for the honeycomb structure forming die is used to form hexagonal slits in the die base body in which any introduction hole or slit is not formed. A honeycomb electrode 100 shown in FIG. 3A and FIG. 3B (the electrode for the honeycomb structure forming die) is constituted of an electrode base body 102. In one surface 107 of the electrode base body, a plurality of electrode cells 142 partitioned by electrode partition walls 141 are formed, and in the other surface 108, round holes 145 which communicate with the electrode cells 142 are formed. When the one surface 107 is seen, it is possible to confirm that a shape corresponding to an end surface shape of the honeycomb structure 40 (see FIG. 1) appears as shown in FIG. 3A. The sectional shape which is vertical to the axial direction is also the same. In the honeycomb electrode 100, only portions that partition the plurality of electrode cells 142; in other words, only portions between an electrode cell 142 and an electrode cell 142 are constituted of the electrode partition walls 141. In one of the electrode cells 142, a portion of the cell which is not adjacent to the other electrode cell 142 does not become the electrode partition wall 141, and is the electrode base body 102 itself. On this outer peripheral side, an unprocessed portion of the electrode base body is referred to a fringe portion sometimes in the present description.

Figure 4:
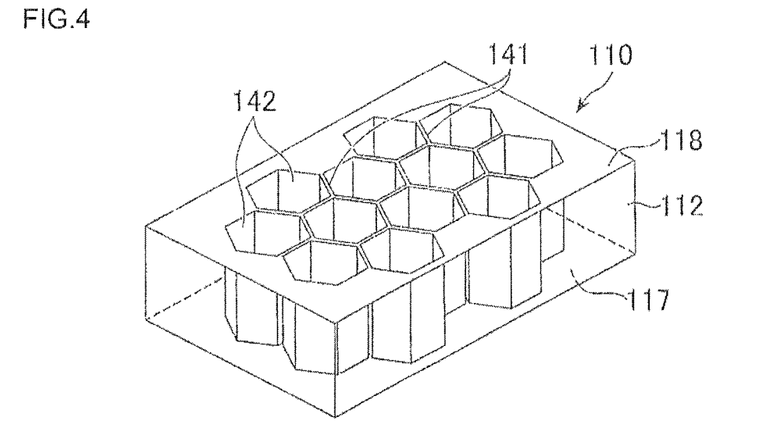
FIG. 4 is a perspective view showing another embodiment of the electrode for the honeycomb structure forming die manufactured by the manufacturing method of the electrode for the honeycomb structure forming die according to the present invention, as seen through the inside of the electrode.

A honeycomb electrode 110 shown in FIG. 4 is constituted of an electrode base body 112 in conformity to the honeycomb electrode 100. In the honeycomb electrode 110, a plurality of electrode cells 142 partitioned by electrode partition walls 141 appear on both of one surface 117 and the other surface 118. That is, when either the one surface 117 or the other surface 118 of the honeycomb electrode 110 is seen, a shape corresponding to an end surface shape or a sectional shape of the honeycomb structure 40 appears. The electrode includes a fringe portion in the same manner as in the honeycomb electrode 100. In the honeycomb electrode 110, only portions that partition the plurality of electrode cells 142; in other words, only portions between an electrode cell 142 and an electrode cell 142 are constituted of the electrode partition walls 141. In one of the electrode cells 142, a portion of the cell which is not adjacent to the other electrode cell 142 does not become the electrode partition wall 141, and is the electrode base body 112 itself.

Figure 9:
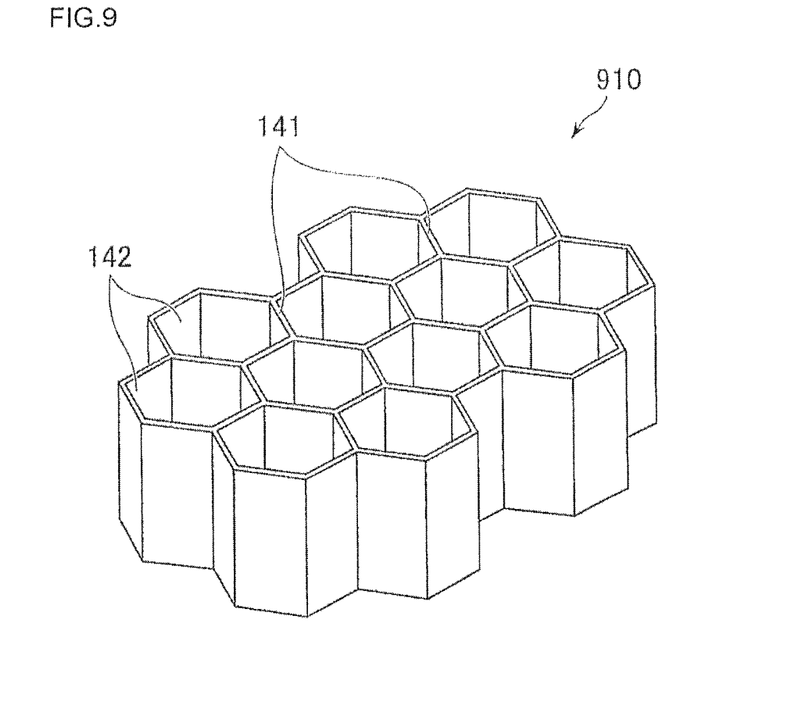
FIG. 9 is a perspective view showing still another embodiment of the electrode for the honeycomb structure forming die manufactured by the manufacturing method of the electrode for the honeycomb structure forming die according to the present invention.

In a honeycomb electrode 910 shown in FIG. 9, a plurality of electrode cells 142 appear on both of one surface and the other surface in the same manner as in the honeycomb electrode 110. However, the honeycomb electrode 910 does not include any fringe portion. In the honeycomb electrode 910, not only portions that partition the plurality of electrode cells 142 but also portions where one electrode cell 142 is not adjacent to another electrode cell 142 are constituted of electrode partition walls 141. In other words, the honeycomb electrode 910 is constituted only of the electrode partition walls 141 which partition the plurality of electrode cells 142, and another portion corresponding to the electrode base body is not present in the honeycomb electrode 910.

Next, there will be described a manufacturing method of the electrode for the honeycomb structure forming die, a method of manufacturing the honeycomb structure forming die and a method of manufacturing the honeycomb structure according to the present invention.

[Manufacturing Method of Electrode for Honeycomb Structure Forming Die] As to the manufacturing method of the electrode for the honeycomb structure forming die according to the present invention, first, the manufacturing of the honeycomb electrode 100 will be described as an example with reference to FIG. 3A, FIG. 3B, FIG. 5A, FIG. 5B, FIG. 6 and FIG. 7.

First, there is prepared a thick plate-like electrode base body which is made of an electricity discharging material and has two surfaces and in which any hole is not processed. This electrode base body is processed to become the electrode base body 102 later, and can be obtained by cutting a commercially available plate-like material into a desirable size. As the electricity discharging material for use as the electrode base body, for example, a copper tungsten alloy, a silver tungsten alloy, copper, carbon graphite or the like can be used. More specifically, a copper tungsten alloy containing Cu at 50 mass % and W at 50 mass % has advantages that boring with a drill or the like is enabled, that conductivity and melting point are high, and hence excels in corrosion resistance and wear resistance, and that electricity discharge characteristics are satisfactory and processing accuracy is high.

Figure 3B:
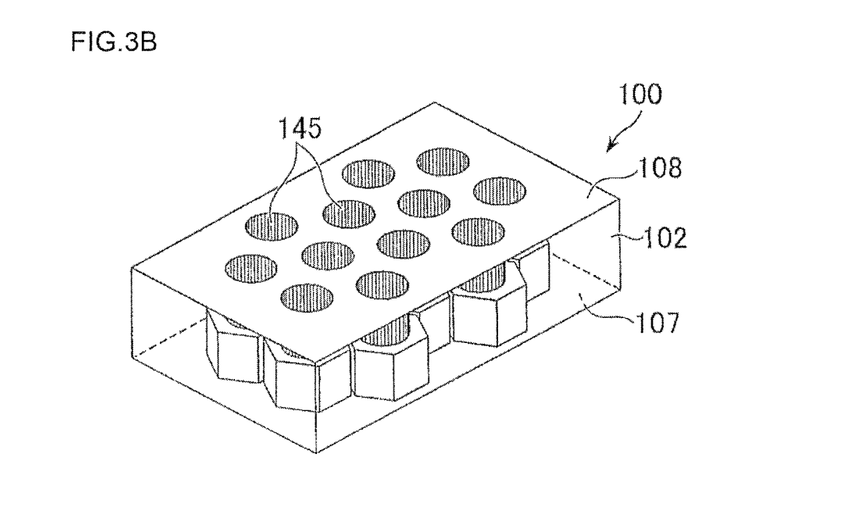
FIG. 3B is a perspective view of the electrode for the honeycomb structure forming die shown in FIG. 3A as seen through the inside of the electrode from the other surface side.
Figure 5A:
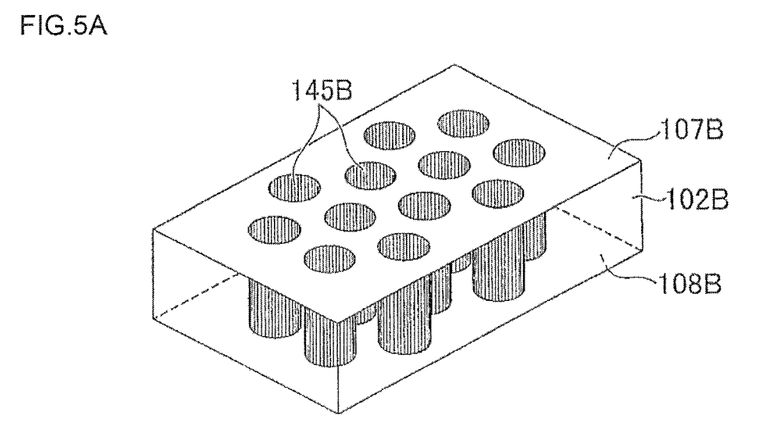
FIG. 5A is a perspective view schematically showing an embodiment of the manufacturing method of the electrode for the honeycomb structure forming die according to the present invention, and showing a behavior that a plurality of round holes are made in an electrode base body as seen through the inside of the electrode base body.
Figure 5B:
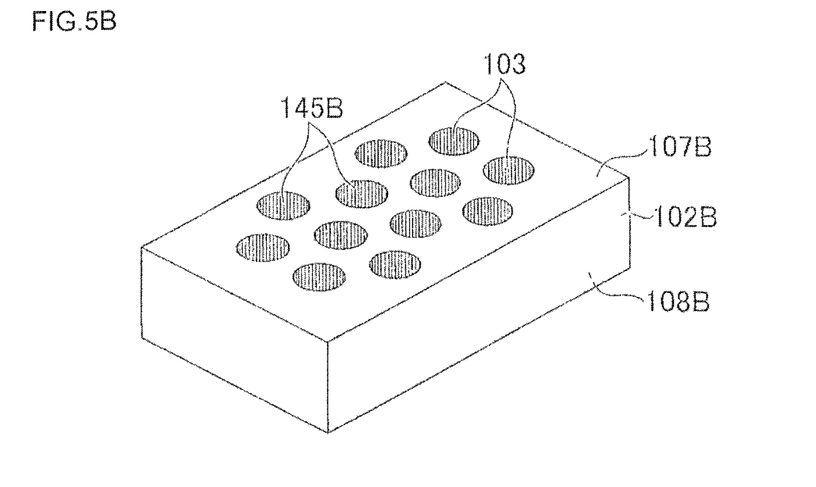
FIG. 5B is a perspective view showing the electrode base body in which the plurality of round holes are made as shown in FIG. 5A, and is not a seen-through view.
Figure 7:
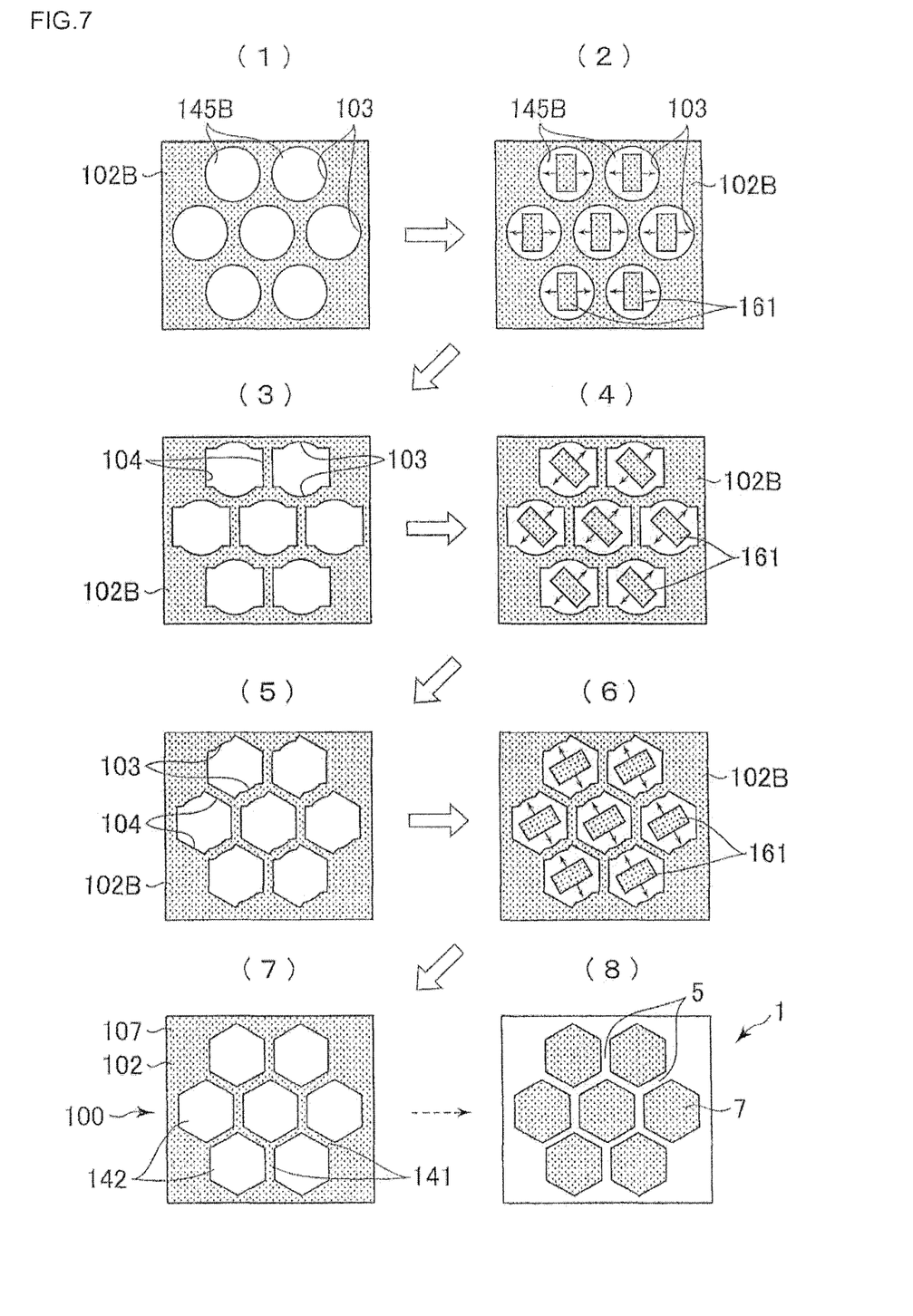
FIG. 7 is a plan view schematically showing an embodiment of the manufacturing method of the electrode for the honeycomb structure forming die according to the present invention, and showing steps in order.

Next, in the electrode base body, a plurality of round holes 145B which extend through one surface 107B and the other surface 108B are made, to obtain an electrode base body 102B (see FIG. 5A, FIG. 5B and (1) of FIG. 7). The round holes 145B can be made by subjecting the electrode base body 102B to, for example, boring with a drill. It is to be noted that FIG. 5A shows a state when seeing through the inside of the electrode base body, and in FIG. 5B, the inside thereof is not seen through. FIG. 3A, FIG. 3B and FIG. 4 described above apparently conform to the configuration shown in FIG. 5B when not seen through. In the electrode base body 102B, the plurality of round holes 145B are made at positions corresponding to, for example, the flow-through cells 42 of the honeycomb structure 40. That is, positions to be provided with the plurality of round holes 145B are determined on the basis of design, e.g., a flow-through cell size, a flow-through cell pitch, etc. of the honeycomb structure to be finally obtained. The round holes mean holes each having a round shape which appears on the surface of the electrode base body. This round hole can be regarded as a columnar shape. In this case, a space between center axes of the round holes 145B can be from about 0.80 to 2.50 mm. Moreover, a radius of a circle which is vertical to the center axis can be from about 0.40 to 1.20 mm.

Figure 6:
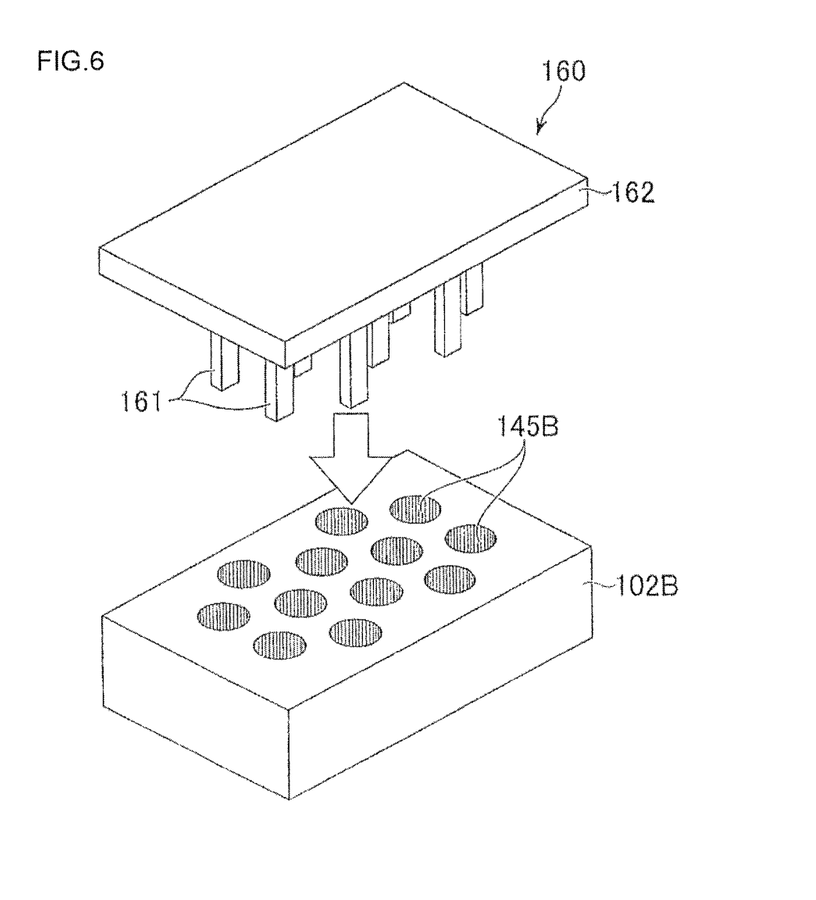
FIG. 6 is a perspective view schematically showing an embodiment of the manufacturing method of the electrode for the honeycomb structure forming die according to the present invention, and showing a behavior that processing electrodes are to be inserted into a plurality of round holes.

Next, each of processing electrodes 161 preferably made of carbon graphite is inserted into about a half of a depth of each of the round holes 145B, e.g., from about 1 to 10 mm (see FIG. 6). This depth corresponds to a depth of each of the hexagonal electrode cells 142 obtained later, and at least a depth which is not smaller than a slit depth of a die to be prepared by using the obtained electrode is required. Each of the processing electrodes 161 has a prism shape, e.g., a quadrangular rod shape or a hexagonal rod shape, and the plurality of processing electrodes 161 are integrated through a support portion 162, to become a combtooth-like electrode 160 as a whole. Then, the inserted processing electrodes 161 discharge electricity from the insides of the round holes 145B toward hole side surfaces 103 of the electrode base body 102B, to process the hole side surfaces 103 of the electrode base body 102B (see (2) of FIG. 7). In electric discharge machining of the hole side surfaces 103, about a half of each of the round holes 145B in a depth direction, e.g., specifically about 1 to 10 mm is changed to the hexagonal electrode cell 142 (see FIG. 3A). During this electric discharge machining, the processing electrodes 161 are preferably moved in parallel along a direction shown by arrows in FIG. 7(2). By this parallel movement, the processing electrodes 161 come close to the opposing hole side surfaces 103, to process the surfaces into flat surfaces. Then, after this first electric discharge machining, opposing portions of the hole side surfaces 103 become flat surfaces 104 (see (3) of FIG. 7).

Afterward, the processing electrodes 161 are once removed, and an angle is changed as much as, for example, 60° in a left rotating direction from the state of FIG. 7(2), to insert the processing electrodes again. Then, the electricity is discharged toward the hole side surfaces 103 of the electrode base body 102B to process the surfaces (see (4) of FIG. 7). Next, the processing electrodes 161 are similarly once removed, and the angle is further changed as much as 60° in the left rotating direction (120° (or −60°) in the left rotating direction from the first position), to insert the processing electrodes again. Then, the electricity is discharged toward the hole side surfaces 103 of the electrode base body 102B to process the surfaces (see (6) of FIG. 7). By such processing, the hole side surfaces 103 change to the flat surfaces 104 every time (see (5) and (7) of FIG. 7), and finally the half of each of the round holes 145B in the depth direction becomes the hexagonal electrode cell 142. As described above, the honeycomb electrode 100 is obtained (see (7) of FIG. 7, and FIG. 3A). It is to be noted that the remaining half of each of the round holes 145B in the depth direction becomes the round hole 145 as it is (see FIG. 3B).

The angle can be changed by using the same combtooth-like electrode 160, depending on an arrangement of the plurality of round holes 145B and additionally, the flow-through cell size, the flow-through cell pitch and the like of the honeycomb structure. However, another combtooth-like electrode is required sometimes.

It is to be noted that as described above, each drawing is a schematic view, and FIG. 7 shows only seven electrode cells to facilitate the understanding of the steps, unlike FIG. 3A, FIG. 3B and FIG. 6. FIG. 3A, FIG. 3B and FIG. 6 show 12 electrode cells. Any number is not necessarily a practically appropriate number. A honeycomb electrode including a fringe portion as in the honeycomb electrode 100 is used to prepare the honeycomb structure forming die as a full-size honeycomb electrode at a time, and hence the number of the electrode cells is actually determined on the basis of specifications of the honeycomb structure forming die to be obtained further on the basis of specifications of the honeycomb structure. On the other hand, in a honeycomb electrode which does not include any fringe portion as in the honeycomb electrode 910, the number of the electrode cells is determined on the basis of the specifications of the honeycomb structure forming die to be obtained further based on the specifications of the honeycomb structure, but the number of the electrode cells may be small. This is because this type of structure forming die can be prepared by using in plural times a honeycomb electrode which does not include any fringe portion, i.e., the partial-size honeycomb electrode.

Figure 8:
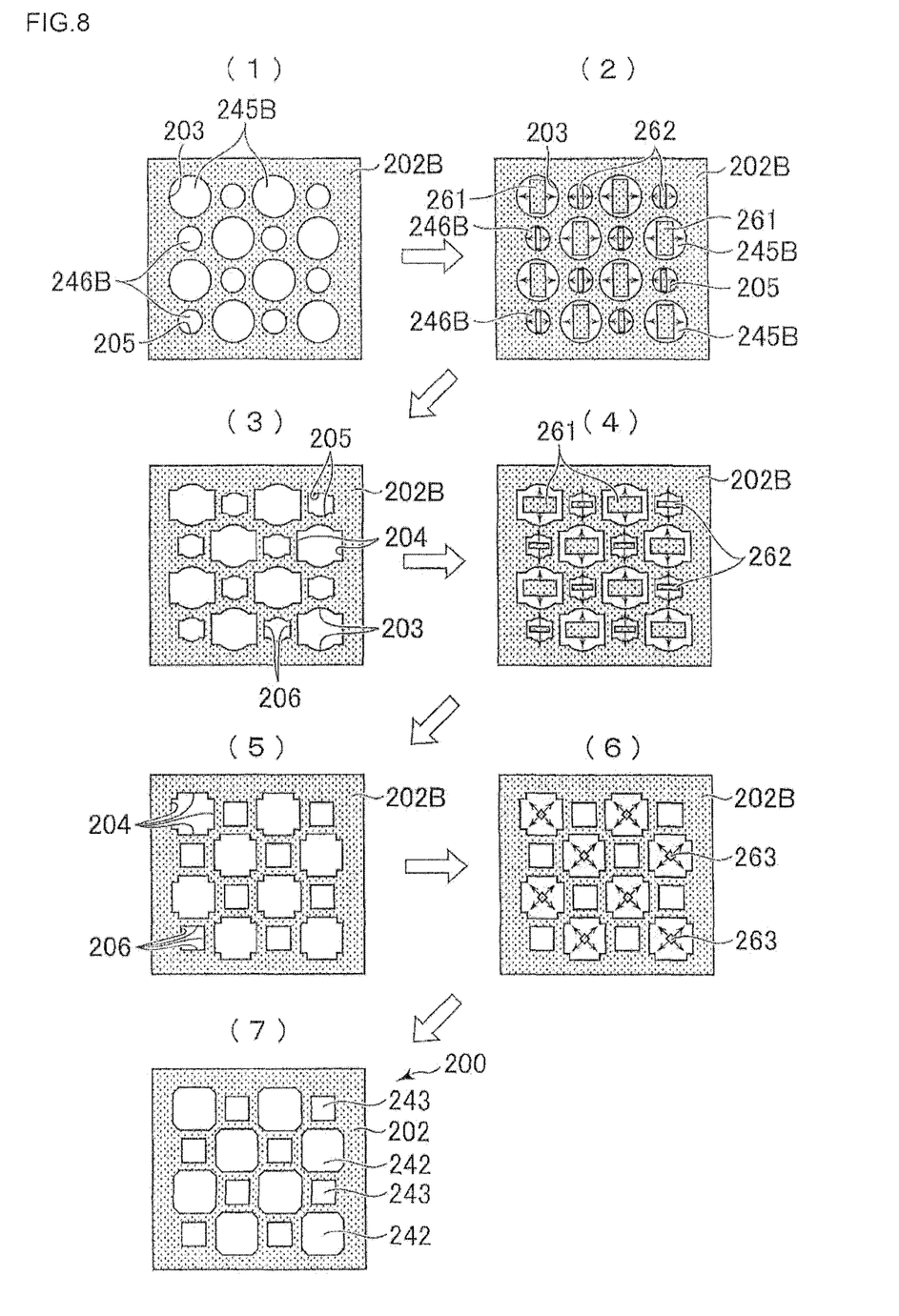
FIG. 8 is a plan view schematically showing another embodiment of the manufacturing method of the electrode for the honeycomb structure forming die according to the present invention, and showing steps in order.

The manufacturing of the honeycomb electrode 100 has been described above as an example. However, in the manufacturing method of the electrode for the honeycomb structure forming die according to the present invention, the shapes of the electrode cells of the honeycomb electrode may be an octagonal shape and a quadrangular shape, but not the hexagonal shape. Hereinafter, there will be described a case where the shapes of the electrode cells of the honeycomb electrode are a large octagonal shape and a small quadrangular shape, with reference to FIG. 8. FIG. 8 is a schematic view drawn to facilitate the understanding of steps, and needless to say, the number of the electrode cells shown in FIG. 8 is not necessarily a practically appropriate number.

First, in the same manner as in the honeycomb electrode 100, there is prepared a thick plate-like electrode base body which is made of an electricity discharging material and has two surfaces. Next, large round holes 245B and small round holes 246B are made as through holes in the electrode base body, to obtain an electrode base body 202B (see (1) of FIG. 8).

Then, each of processing electrodes 261 having a prism shape is inserted into about a half of a depth of each of the round holes 245B, specifically, from about 1 to 10 mm, and each of processing electrodes 262 having a prism shape is similarly inserted into about a half of a depth of each of the round holes 246B, specifically, from about 1 to 10 mm. When a combtooth-like electrode is used in which the plurality of processing electrodes 261 and 262 are integrated through a support portion, these operations can be performed at a time. Then, the inserted processing electrodes 261 discharge electricity from the insides of the round holes 245B toward hole side surfaces 203 of the electrode base body 202B, to process the hole side surfaces 203 of the electrode base body 202B. Similarly, the inserted processing electrodes 262 discharge the electricity from the insides of the round holes 246B toward hole side surfaces 205 of the electrode base body 202B, to process the hole side surfaces 205 of the electrode base body 202B (see (2) of FIG. 8). During this electric discharge machining, the processing electrodes 261 and 262 are preferably moved in, parallel along a direction shown by arrows in FIG. 8(2). By this parallel movement, the processing electrodes 261 and 262 come close to the opposing hole side surfaces 203 and 205, to process the surfaces into flat surfaces. Then, after this first electric discharge machining, opposing portions of the hole side surfaces 203 and 205 become flat surfaces 204 and 206 (see (3) of FIG. 8). Then, an angle is changed as much as 90° from the state of FIG. 8(2), to similarly insert the processing electrodes 261 and 262, thereby discharging the electricity toward the hole side surfaces 203 and 205 of the electrode base body 202B to process the surfaces (see (4) of FIG. 8). After this second electric discharge machining, the hole side surfaces 203 of the round holes 245B except four corners become the flat surfaces 204. In this case, a section of the half of each of the round holes 245B in a depth direction, which is vertical to the depth direction, has a shape close to a quadrangular shape. Moreover, the hole side surfaces 205 of the round holes 246B become the flat surfaces 206. In this case, a section of the half of each of the round holes 246B in the depth direction, which is vertical to the depth direction, has a quadrangular shape (see (5) of FIG. 8). It is to be noted that in the above steps, first the processing is performed by using the only processing electrodes 261, and is then performed by using the processing electrodes 262. Thus, the processing electrodes may be used in order.

Next, each of processing electrodes 263 which are smaller than the processing electrodes 261 is inserted only into the round holes 245B, i.e., the original round holes, although the holes strictly are not already the round holes by the processing to about a half, specifically, from about 1 to 10 mm of a depth, to discharge the electricity toward four corners, i.e., corner portions of the above quadrangular shape (see (6) of FIG. 8). During this electric discharge machining, the processing electrodes 263 are preferably moved in parallel along a direction shown by arrows in (6) of FIG. 8. By this parallel movement, the processing electrodes 263 come close to the four corners of the above quadrangular shape, to process the portions into flat surfaces. Then, the flat surfaces are formed in the four corners, i.e., the corner portions of the quadrangular shape. Finally, it is possible to obtain a honeycomb electrode 200 consisted of an electrode base body 202 in which the half of each round hole 245B in the depth direction becomes an octagonal electrode cell 242 and the half of the round hole 246B in the depth direction becomes a quadrangular electrode cell 243 (see (7) of FIG. 8). It is to be noted that the remaining half of each of the round holes 245B and 246B in the depth direction becomes the round hole as it is.

As described above, all or part of the shape corresponding to the end surface shape of the honeycomb structure appears on the surface of the honeycomb electrode on which the electrode cells appear. Therefore, the honeycomb electrode 200 is used to prepare the forming die, when obtaining the honeycomb structure including octagonal flow-through cells each having a large sectional shape and quadrangular flow-through cells each having a small sectional shape.

[Method of Manufacturing Honeycomb Structure Forming Die] There will be described, as an example, a case where the die 1 (see FIG. 2A to FIG. 2C) is manufactured by using the honeycomb electrode 100 as an example of the honeycomb electrode.

First, there is prepared a thick plate-like die base body which is made of, for example, a commercially available stainless steel alloy (SUS630) and has two surfaces and in which any introduction hole or slit is not provided. This die base body becomes the die base body 2, when the introduction holes 4 and the slits 5 are provided.

Next, the introduction holes 4 which are open in the thickness direction are formed in the die base body by known means, e.g., electrolytic machining (ECM), electric discharge machining (EDM), laser processing, machining such as drilling, or the like. The introduction holes 4 are formed at such positions as to communicate with intersection portions of the slits 5 formed later and each having a hexagonal shape (see FIG. 2C). According to the die 1 obtained in this manner, when the extrusion forming is performed, the forming raw material introduced through the introduction holes 4 can uniformly be spread over all the slits 5, and excellent forming properties can be realized.

Then, the electric discharge machining is performed from the surface of the die base body opposite to the surface thereof provided with the introduction holes 4 by use of the honeycomb electrode 100, to form the slits 5 in the opposite surface, whereby the die 1 having a complementary shape to the honeycomb electrode 100 can be obtained (see (8) of FIG. 7). This electric discharge machining can be performed while pressing the honeycomb electrode 100 onto the surface of the die base body opposite to the surface thereof provided with the introduction holes 4, by use of a usual NC electric discharge machine and an electric discharge machining oil.

It is to be noted that, for example, the honeycomb electrode 100 includes the fringe portion. Therefore, in actual, the configuration, the number and the like of the electrode cells and electrode partition walls of the electrode are determined on the basis of the specifications, e.g., the configuration, the number and the like of the slits of the die 1 to be obtained as described above.

[Method of Manufacturing Honeycomb Structure] First, a cordierite forming raw material obtained by mixing, for example, alumina, kaolin and talc is used. For example, 5 parts by mass of binder such as methylcellulose or the like and 20 parts by mass of dispersion medium such as water or the like are mixed with 100 parts by mass of cordierite forming raw material, followed by kneading, to obtain a kneaded clay.

Next, when the obtained kneaded clay is extruded by the extrusion forming machine to which the die 1 is attached, the kneaded clay introduced through the introduction holes 4 moves toward the slits 5, and is extruded through openings of the slits 5 on a side opposite to the introduction holes 4, to obtain a honeycomb formed body. Then, the honeycomb formed body is fired, whereby the honeycomb structure 40 can be obtained as an example of the honeycomb structure.

It is to be noted that in the die for preparing the honeycomb structure or the honeycomb formed body at a time, the configuration, the number and the like of the slits are determined on the basis of the specifications of the honeycomb structure or the honeycomb formed body to be obtained, i.e., the configurations, the numbers and the like of the porous partition walls and flow-through cells in the same manner as in the honeycomb electrode and the die. Moreover, a plurality of honeycomb formed bodies (segments) having a schematically prism shape are obtained by use of, for example, the die 1 having a configuration shown in FIG. 2C, and the bodies are bonded. Afterward, an outer shape of the bonded formed bodies is processed into a columnar shape, whereby it is possible to obtain the honeycomb structure 40 shown in FIG. 1.

INDUSTRIAL APPLICABILITY

A manufacturing method of an electrode for a honeycomb structure forming die according to the present invention is preferably utilized as means for manufacturing the electrode for use in processing the die to be used for forming a honeycomb structure which is often used as a filter or a catalyst carrier.

EXPLANATION OF REFERENCE NUMERALS

1: die (honeycomb structure forming die), 2: die base body, 4: introduction hole, 5: slit, 7: one surface (of the die), 8: the other surface (of the die), 40: honeycomb structure, 41: porous partition wall, 42: flow-through cell, 100, 110, 200 and 910: honeycomb electrode (electrode for the honeycomb structure forming die), 102 and 112: electrode base body (of the honeycomb electrode), 102B: electrode base body (before becoming the honeycomb electrode), 103: hole side surface, 104: flat surface, 107: one surface (of the honeycomb electrode), 107B; one surface (of the electrode base body before becoming the honeycomb electrode), 108: the other surface (of the honeycomb electrode), 108B: the other surface (of the electrode base body before becoming the honeycomb electrode), 117: one surface (of the honeycomb electrode), 118: the other surface (of the honeycomb electrode), 141: electrode partition wall, 142: electrode cell, 145: round hole (of the honeycomb electrode), 145B: round hole (of the electrode base body before becoming the honeycomb electrode), 160: combtooth-like electrode, 161: processing electrode, 162: support portion, 202: electrode base body (of the honeycomb electrode), 202B: electrode base body (before becoming the honeycomb electrode), 203: hole side surface, 204: flat surface, 205: hole side surface, 206: flat surface, 242: electrode cell, 243: electrode cell, 245B: round hole (of the electrode base body before becoming the honeycomb electrode), 246B: round hole (of the electrode base body before becoming the honeycomb electrode), 261: processing electrode, 262: processing electrode, and 263: processing electrode.

The invention claimed is:

1. A manufacturing method of an electrode for a honeycomb structure forming die which forms a honeycomb structure including a plurality of flow-through cells partitioned by porous partition walls, the method comprising:
   preparing a thick plate-like electrode base body made of an electricity discharging material and having two surfaces;
   making a plurality of through holes at positions corresponding to the flow-through cells, in the electrode base body;
   inserting processing electrodes into the plurality of holes, respectively, and discharging electricity from the insides of the holes toward side surfaces of the holes of the electrode base body to process the side surfaces of the holes of the electrode base body into shapes corresponding to the porous partition walls;
   whereby obtaining an electrode where a plurality of electrode cells partitioned by electrode partition walls appear on at least one of the surfaces thereof.

2. The manufacturing method of the electrode for the honeycomb structure forming die according to claim 1, wherein the plurality of processing electrodes are used for the plurality of holes, and the plurality of processing electrodes are integrated through a support portion.

3. The manufacturing method of the electrode for the honeycomb structure forming die according to claim 1, wherein the shape of the processing electrode is a prism shape.

4. The manufacturing method of the electrode for the honeycomb structure forming die according to claim 2, wherein the shape of the processing electrode is a prism shape.

5. The manufacturing method of the electrode for the honeycomb structure forming die according to claim 1, wherein the shape of each of the electrode cells is a hexagonal shape.

6. The manufacturing method of the electrode for the honeycomb structure forming die according to claim 1, wherein the shapes of the electrode cells are an octagonal shape and a quadrangular shape.

* * * * *